Patented Sept. 24, 1929

1,729,409

UNITED STATES PATENT OFFICE

JOHN RAYMOND WHITE, OF LONG ISLAND CITY, NEW YORK

DOUGH COMPOSITION AND PROCESS OF MAKING THE SAME

No Drawing.    Application filed March 22, 1928.    Serial No. 263,969.

This invention relates to a dough composition and process of making the same; more particularly to a composition for leavening or maturing bread dough involving yeast as a component thereof and the process of making a dough batch therefrom.

It is an object of my invention to prepare a bread leavening or maturing composition involving yeast as a component thereof, which will materially shorten the time required for maturing the bread dough or the time elapsing between the preparation of a dough batch, the addition of the leavening compound and the baking. It is contemplated by my invention to prepare a yeast which may be added to a dough batch in the ordinary manner and eliminate substantially entirely the time necessary for maturing the dough batch so that upon the addition of the yeast to the dough batch there is merely required the thorough admixture of the ingredients, whereupon the dough so prepared may be immediately spread and cut or arranged for baking without awaiting the normal period for glutenizing of the dough.

Where I add ordinary liquefied yeast to a dough batch, particularly yeast which has been grown to become acclimatized to the ingredients of a dough batch, particularly such components as salt, iodates or bromates or combinations of the same, as a time saving factor or to effect an economy in the quantity of the yeast to be used, there is a certain amount of care to be exercised by the baker in determining just when the dough has matured or glutenized properly for baking purposes. Usually the baker determines from the appearance of the dough, after the addition of the leavening compound, when the maturing has progressed sufficiently so that the dough may be spread, cut and incorporated on the trays for baking purposes. Not only is there a great deal of time involved but the exercise of a great deal of care is also required.

It is a further object of my invention to prepare a composition to be added to a dough batch where substantially no care need be given to the character of the dough to determine whether it has become properly matured or glutenized and substantially eliminate the time factor usually allowed after the addition of yeast to a dough batch for glutenizing or maturing purposes. My invention enables one unskilled in determining the proper characteristics of the dough batch to quickly and efficiently prepare dough for baking purposes merely by completely and uniformly incorporating the ingredients of the dough batch without any danger of allowing an improper time for glutenizing or maturing the dough and without any danger of wastage by spoiling the dough batch.

My invention has particular utility in connection with dough batches where special mineral salts have been added to the flour with a view towards activating the yeast or where a large quantity of material may be added for flavoring purposes, such as salt, which also assists in the glutenization of the dough. My invention contemplates the preparation of a yeast including mucic acid as a component thereof, the composition thus prepared serving to almost immediately mature the dough.

In the addition of mucic acid to a dough batch, I have found that a great deal of care must be exercised, due to the insoluble character of the mucic acid. It is therefore preferred to add the mucic acid where a great economy is effected, as well as to render the mucic acid more effective. For this purpose mucic acid may be added as a dry powder with dry yeast. A leavening composition which I have found will be most effective comprises dry yeast not more than 99%, mucic acid from 1 to 1.75%. The best results are obtained in the calculation of the addition of mucic acid so that when the yeast is added to the flour a quantity of .05 grams of mucic acid will be added for every pound of flour in the dough batch.

In its preferred form, my invention contemplates the preparation of the yeast composition at the time when the yeast is propagated. For this purpose the yeast is produced to acclimatize the same to sodium chloride, a compound containing a halogen-oxygen acid radical and mixtures thereof. Thus, it is contemplated to produce a yeast which is acclimatized to sodium chloride and/or a compound containing a halogen-oxygen acid radical or combinations thereof. Thus, I may acclimatize yeast to sodium chloride and/or iodic acid, bromic acid, sodium bromate, sodium iodate, calcium iodate or bromate or mixtures thereof by successive propagations of yeast in the presence of solutions containing at least 0.5% of sodium chloride, with or without at least 0.005% of an inorganic compound containing a halogen-oxygen acid radical.

In the preparation of the yeast from the seed, yeast is propagated in a series of fermentable solutions, preferably sacchariferous solutions, each of the series containing from a mere trace of sodium chloride with or without a mere trace of one or more of the compounds containing the halogen-oxygen acid radical until the yeast has been propagated in a solution containing the upper limit of sodium chloride with or without the compound containing the halogen-oxygen acid radical. Preferably, the yeast is propagated in a successive series of sacchariferous solutions, each gradually increasing the concentration of the sodium chloride with or without potassium iodate, until the solution contains about 3% sodium chloride and about .75% of potassium iodate. The yeast so obtained may be used as a commercial seed yeast and propagated in a fermentable solution, preferably a sacchariferous solution, maintaining the concentration of salt substantially constant between 0.5% to 5% of sodium chloride and the compound containing the halogen-oxygen acid radical in proportions of from .005 to .75%.

It is preferred to prepare the commercial yeast in a fermentable sacchariferous solution, such as molasses, in which the salt concentration is about 3%, with or without .75% of the compound containing the halogen-oxygen acid radical. The commercial yeast is propagated until about six successive generations of yeast have been grown. Just prior to the last generation or mash step, I add a quantity of mucic acid in proportions of at least 2%, utilizing mucic acid in the powdered form. It is preferred to add from .015 to 2.25% of mucic acid. Where the yeast has been grown in the presence of salts including an iodate, mucic acid is preferably added in quantities of about three times the quantity of the iodate. Thus, where I may use from .005 to .75% of potassium iodate in the solution of a fermentable liquid, such as molasses, in the last mash step I may add the mucic acid in percentages of .015 to 2.25% of mucic acid.

The mucic acid may be added as the pure acid or in the form of a compound containing the mucic acid radical. Where the compound is used I may add a compound of the alkali metals or the alkaline earth metals. Thus I may add the potassium salt of mucic acid or the calcium salt of mucic acid. The yeast so prepared may be pressed and filtered in the ordinary manner so that when it comes from the press it contains approximately about 65% of combined water.

Where yeast is propagated in the presence of a compound containing the halogen-oxygen acid radical, such as an iodate, this yeast is of material value in producing a bleached effect upon the flour in the final bread. Where the iodate is used in the minimum percentage above given and it is desired to obtain a proper bleaching effect upon the dough, an additional quantity of the compound containing the halogen-oxygen acid radical may be added to the dry yeast, in which case, particularly where the potassium iodate is used, this may be added to the dry yeast to bring it up to about .75%.

A yeast as above prepared is added to the aqueous medium such as water to liquefy the same in the normal manner for preparing a dough batch, the dough batch containing the proper quantity of flour, salt and other ingredients having been separately prepared. The liquefied yeast is then intimately mixed with the dough in the ordinary way and becomes almost immediately elastic, permitting it to be spread and cut and placed upon the trays or similar forms for baking purposes, thus effecting a saving in the time normally used for maturing and glutenizing the dough of from one half to four and one half hours, including the most rapid leavening compounds and the maximum permissible quantity of yeast that may be added. The mixing operation of four minutes to incorporate the yeast component in its aqueous medium is sufficient to mature the dough. I may make what may be considered a "no-dough time" yeast by raising the temperature of the dough batch slightly and I find it best to raise the temperature of the dough batch to operate at temperatures from 82 to 84° F.

Where the bleaching or whitening effect is unimportant, the yeast may be propagated without the addition of the compound containing the halogen-oxygen acid radical and the mucic acid or salts containing compounds of the mucic acid radical may be used alone. Thus, where making such bread as rye or Graham bread, the iodate or the like compounds may be omitted.

I consider that the addition of the mucic acid or the salt of mucic acid in the last mash step as my preferred form as it serves to overcome the defects in using the normally insoluble mucic acid by a conversion which makes the mucic acid assimilable. However, I may add the mucic acid or the compounds thereof to the dry yeast, obtaining some beneficial results. Thus dry yeast as it comes from the press, containing about 65% of water, may have added thereto from 1 to 1.7% of mucic acid.

Another variation of the process comprises taking the necessary quantity of yeast, liquefying the same in the customary manner in water and just prior to its addition to the dough batch, adding mucic acid in quantities calculated so as to be present in about .05 grams of mucic acid or the compounds thereof to every pound of flour in the dough batch. I may also take the dry flour prior to its formation into a dough batch and mix therewith the dry powder containing mucic acid or the compound thereof. The liquefied yeast may then be added in the customary manner. It is preferred in this form to use a salt acclimatized yeast propagated as in the manner above described.

The economy effected by the yeast as prepared in accordance with my process would be about one third or one half the quantity of yeast, in addition to the fact that no additional ingredients need be added to the batch of dissolved yeast to start the yeast fermenting. The dissolved yeast, particularly as made in the preferred process of adding the mucic acid to the last batch step, may be immediately added to the mixer. Thus, the dissolved yeast may be added to the mixer and the dough immediately placed upon the baker's bench.

By the procedure outlined, I obtain a leavening compound or a dough batch which eliminates almost entirely the period of time ordinarily allowed for maturing the dough batch, thus effecting an economy in time as well as avoiding the necessity of utilizing skilled help in judging whether the dough batch has matured sufficiently, as the batch or batter, immediately upon adding the yeast, may be spread, cut and used for baking purposes.

Having thus described my invention and illustrated its use, what I claim as new and desire to secure by Letters Patent, is—

1. In the process of preparing a bread leavening compound, the steps which include successively propagating yeast in a series of fermentable liquids, the last of which has added thereto a mucic acid compound.

2. In the process of preparing a bread leavening compound, the steps which include successively propagating yeast in a series of fermentable liquids, the last of which has added thereto mucic acid.

3. In the process of preparing a bread leavening compound, the steps which include propagating yeast, adding a mucic acid compound thereto and separating the yeast so propagated from its aqueous medium.

4. A bread leavening compound comprising yeast and mucic acid.

5. A bread leavening compound comprising yeast and a compound of mucic acid.

6. A bread leavening compound comprising yeast and an alkali metal salt of mucic acid.

7. A bread leavening compound comprising a compound containing the halogen-oxygen acid radical and mucic acid.

8. A bread leavening compound comprising yeast and from 1 to 1.75% of mucic acid.

In witness whereof I have hereunto signed my name this 16th day of March, 1928.

JOHN RAYMOND WHITE.